(12) United States Patent
Kwon et al.

(10) Patent No.: US 10,408,307 B2
(45) Date of Patent: Sep. 10, 2019

(54) MULTI-STAGE TRANSMISSION FOR VEHICLES

(71) Applicants: HYUNDAI MOTOR COMPANY, Seoul (KR); KIA Motors Corporation, Seoul (KR)

(72) Inventors: Hyun Sik Kwon, Seoul (KR); Seong Wook Ji, Gunpo-si (KR); Ki Tae Kim, Incheon (KR); Ju Hyeon Park, Suwon-si (KR); Il Han Yoo, Hwasun-eup (KR); Seong Wook Hwang, Gunpo-si (KR); Won Min Cho, Hwaseong-si (KR)

(73) Assignees: HYUNDAI MOTOR COMPANY, Seoul (KR); KIA Motors Corporation, Seoul (KR)

( * ) Notice: Subject to any disclaimer, the term of this patent is extended or adjusted under 35 U.S.C. 154(b) by 135 days.

(21) Appl. No.: 15/823,769

(22) Filed: Nov. 28, 2017

(65) Prior Publication Data

US 2019/0093739 A1 Mar. 28, 2019

(30) Foreign Application Priority Data

Sep. 28, 2017 (KR) .......................... 10-2017-0125747

(51) Int. Cl.
*F16H 3/66* (2006.01)
*F16H 37/04* (2006.01)
*F16H 3/44* (2006.01)

(52) U.S. Cl.
CPC .............. *F16H 3/66* (2013.01); *F16H 37/04* (2013.01); *F16H 2003/445* (2013.01); *F16H 2200/0065* (2013.01); *F16H 2200/2012* (2013.01); *F16H 2200/2046* (2013.01)

(58) Field of Classification Search
CPC ...... F16H 3/66; F16H 37/04; F16H 2003/445; F16H 2200/2046; F16H 2200/0065; F16H 2200/2012
See application file for complete search history.

(56) References Cited

U.S. PATENT DOCUMENTS

| 9,587,714 | B2 | 3/2017 | Kook et al. | |
| 2010/0279814 | A1* | 11/2010 | Brehmer | F16H 3/66 475/275 |
| 2015/0031493 | A1* | 1/2015 | Beck | F16H 3/666 475/275 |

* cited by examiner

*Primary Examiner* — Jeffrey A Shapiro
(74) *Attorney, Agent, or Firm* — McDonnell Boehnen Hulbert & Berghoff LLP

(57) ABSTRACT

A multi-stage transmission for vehicles includes an input shaft for receiving power from an engine; an output shaft for outputting the power; and a first, a second, a third, and a fourth planetary gear device. Each of the planetary gear devices has three rotary elements. The transmission further includes a first rotary shaft connected to the input shaft; a second rotary shaft; a third rotary shaft; a fourth rotary shaft; a fifth rotary shaft; a sixth rotary shaft; a seventh rotary shaft connected to a first rotary element of the third planetary gear device; and an eighth rotary shaft connected to a third rotary element of the fourth planetary gear device and to the output shaft.

4 Claims, 2 Drawing Sheets

FIG. 2

| GEAR STAGE | CL1 | CL2 | CL3 | B1 | B2 | B3 | GEAR RATIO |
|---|---|---|---|---|---|---|---|
| 1ST |  |  | ● | ● |  | ● | 5.000 |
| 2ND | ● |  | ● |  |  | ● | 3.143 |
| 3RD |  | ● | ● |  |  | ● | 2.400 |
| 4TH | ● | ● |  |  |  | ● | 1.507 |
| 5TH | ● | ● | ● |  |  |  | 1.000 |
| 6TH | ● | ● |  |  | ● |  | 0.786 |
| 7TH | ● | ● |  | ● |  |  | 0.712 |
| 8TH |  | ● |  | ● | ● |  | 0.667 |
| 9TH |  | ● | ● | ● |  |  | 0.588 |
| REV | ● |  |  | ● |  | ● | −10.400 |

MULTI-STAGE TRANSMISSION FOR VEHICLES

CROSS-REFERENCE TO RELATED APPLICATION

This application claims the priority benefit of Korean Patent Application No. 10-2017-0125747, filed on Sep. 28, 2017 in the Korean Intellectual Property Office, the disclosure of which is incorporated herein by reference.

BACKGROUND OF THE DISCLOSURE

1. Field of the Disclosure

The present disclosure relates to a multi-stage transmission for vehicles, and more particularly to a multi-stage transmission for vehicles configured such that the maximum possible number of gear shift stages is realized through a relatively small number of parts and a straightforward structure, whereby the fuel economy of vehicles is improved.

2. Description of the Related Art

The recent increase in oil prices has forced vehicle manufacturers all around the world to improve the fuel economy of vehicles. In particular, extensive effort has been made to reduce the weight of engines through various technologies, such as downsizing, thereby improving the fuel economy of vehicles.

One of the fuel economy improvement methods that are applicable to a transmission provided in a vehicle is increasing the number of gear shift stages of the transmission such that the engine can be operated at a more efficient operation point, thereby ultimately improving fuel economy.

In the case in which the number of gear shift stages of the transmission is increased, the engine can be driven within a relatively low RPM range of the engine, whereby the noise of the vehicle may be further attenuated.

As the number of gear shift stages of the transmission is increased, the number of parts constituting the transmission is also increased, with the result that the ease of fitting the transmission in the vehicle is lowered, the costs and weight of the transmission are increased, and the transfer efficiency of the transmission is reduced. For these reasons, it is important to provide a transmission that exhibits maximum efficiency while having a small number of parts and a relatively straightforward structure in order to maximize the effect of improving fuel efficiency through the increase in the number of gear shift stages of the transmission.

The matters disclosed in this section are merely for enhancement of understanding of the general background of the disclosure and should not be taken as an acknowledgment or any form of suggestion that the matters form the related art already known to a person skilled in the art.

SUMMARY OF THE DISCLOSURE

It is an object of the present disclosure to provide a multi-stage transmission for vehicles configured such that 9 forward stages and 1 reverse stage are realized through a relatively small number of parts and a straightforward structure, whereby the fuel economy of vehicles is improved through driving of an engine at an optimal operation point and the quietness of vehicles is improved through quieter driving of the engine.

In accordance with the present disclosure, the above and other objects can be accomplished by the provision of a multi-stage transmission for vehicles including: an input shaft for receiving power from an engine; an output shaft for outputting the power; a first planetary gear device; a second planetary gear device; a third planetary gear device; and a fourth planetary gear device, each of the planetary gear devices having three rotary elements; a first rotary shaft connected to the input shaft; a second rotary shaft connected to a first rotary element of the first planetary gear device and to a first rotary element of the second planetary gear device; a third rotary shaft connected to a third rotary element of the second planetary gear device; a fourth rotary shaft connected to a second rotary element of the third planetary gear device and to a second rotary element of the fourth planetary gear device; a fifth rotary shaft connected to a second rotary element of the first planetary gear device, to a second rotary element of the second planetary gear device, and to a first rotary element of the fourth planetary gear device; a sixth rotary shaft connected to a third rotary element of the first planetary gear device and to a third rotary element of the third planetary gear device; a seventh rotary shaft connected to a first rotary element of the third planetary gear device; and an eighth rotary shaft connected to a third rotary element of the fourth planetary gear device and to the output shaft.

The multi-stage transmission may further include three clutches that interconnect the rotary shafts in respective pairs and three brakes that selectively connect certain of the rotary shafts, to which the input shaft or the output shaft is not connected, to a transmission case.

The three clutches may include a first clutch mounted between the first rotary shaft and the second rotary shaft; a second clutch mounted between the first rotary shaft and the fourth rotary shaft; and a third clutch mounted between the first rotary shaft and the third rotary shaft; and the three brakes may include a first brake mounted between the sixth rotary shaft and the transmission case; a second brake mounted between the third rotary shaft and the transmission case; and a third brake mounted between the seventh rotary shaft and the transmission case.

The first, second, and third rotary elements of the first planetary gear device may include a first sun gear, a first carrier, and a first ring gear; the first, second, and third rotary elements of the second planetary gear device may include a second sun gear, a second carrier, and a second ring gear; the first, second, and third rotary elements of the third planetary gear device may include a third sun gear, a third carrier, and a third ring gear; and the first, second, and third rotary elements of the fourth planetary gear device may include a fourth sun gear, a fourth carrier, and a fourth ring gear.

BRIEF DESCRIPTION OF THE DRAWINGS

The above and other objects, features and other advantages of the present disclosure will be more clearly understood from the following detailed description taken in conjunction with the accompanying drawings, in which:

FIG. 2 is a table showing operation modes in which respective gear shift stages are realized in the transmission of FIG. 1.

DETAILED DESCRIPTION OF THE PREFERRED EMBODIMENTS

Figure 1:
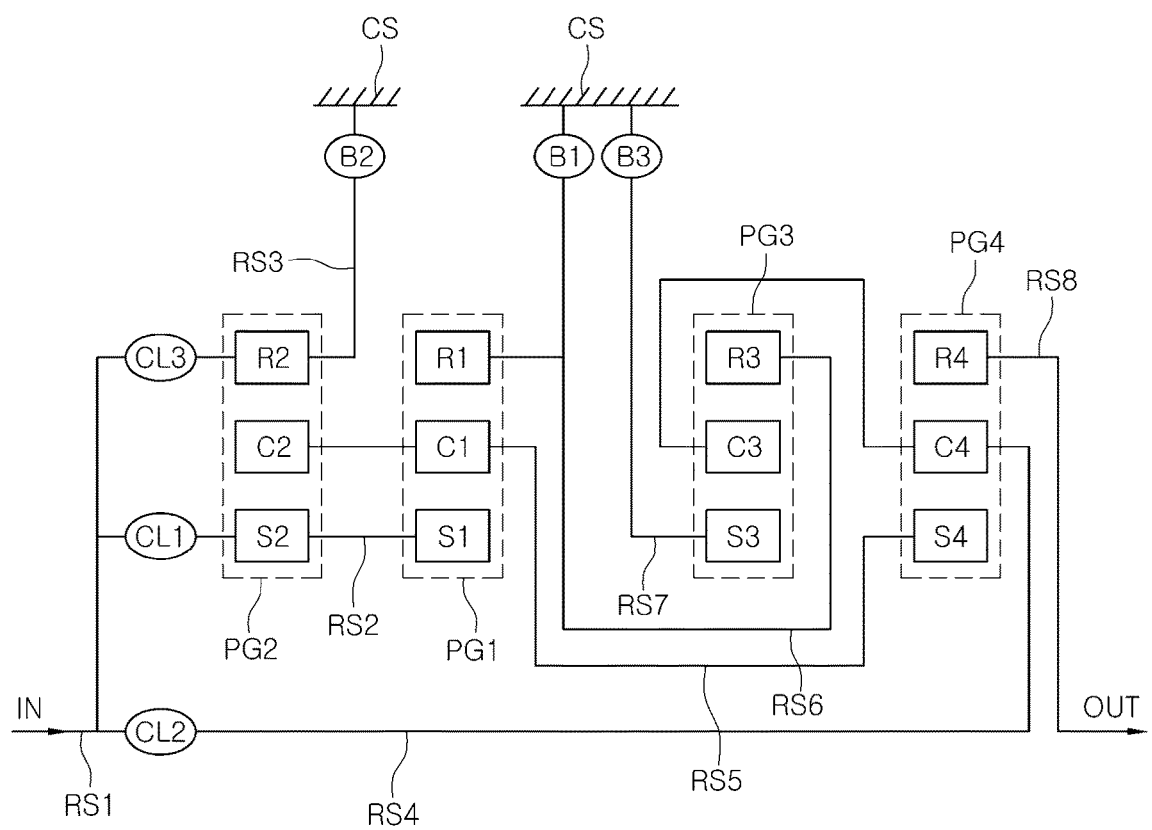
FIG. 1 is a view showing the structure of a multi-stage transmission for vehicles according to the present disclosure.

Hereinafter, exemplary embodiments of a multi-stage transmission for vehicles according to the present disclosure will be described with reference to the accompanying drawings.

Referring to FIG. 1, a multi-stage transmission for vehicles according to the present disclosure includes an input shaft IN and an output shaft OUT, a first planetary gear device PG1, a second planetary gear device PG2, a third planetary gear device PG3, and a fourth planetary gear device PG4 configured to transmit rotary force between the input shaft IN and the output shaft OUT, each of the planetary gear devices having three rotary elements, and six gear shift elements connected to the rotary elements of the planetary gear devices.

In particular, the multi-stage transmission for vehicles according to the present disclosure further includes a first rotary shaft RS1 connected to the input shaft IN; a second rotary shaft RS2 connected to a first rotary element S1 of the first planetary gear device PG1 and to a first rotary element S2 of the second planetary gear device PG2; a third rotary shaft RS3 connected to a third rotary element R2 of the second planetary gear device PG2; a fourth rotary shaft RS4 connected to a second rotary element C3 of the third planetary gear device PG3 and to a second rotary element C4 of the fourth planetary gear device PG4; a fifth rotary shaft RS5 connected to a second rotary element C1 of the first planetary gear device PG1, to a second rotary element C2 of the second planetary gear device PG2, and to a first rotary element S4 of the fourth planetary gear device PG4; a sixth rotary shaft RS6 connected to a third rotary element R1 of the first planetary gear device PG1 and to a third rotary element R3 of the third planetary gear device PG3; a seventh rotary shaft RS7 connected to a first rotary element S3 of the third planetary gear device PG3; and an eighth rotary shaft RS8 connected to a third rotary element R4 of the fourth planetary gear device PG4 and to the output shaft OUT.

In this embodiment, the second planetary gear device PG2, the first planetary gear device PG1, the third planetary gear device PG3, and the fourth planetary gear device PG4 may be sequentially arranged in the axial direction from the input shaft IN to the output shaft OUT.

The six gear shift elements include three clutches that interconnect the rotary shafts in respective pairs and three brakes that selectively connect certain of the rotary shafts, to which the input shaft IN or the output shaft OUT is not connected, to the transmission case CS.

The three clutches include a first clutch CL1 mounted between the first rotary shaft RS1 and the second rotary shaft RS2, a second clutch CL2 mounted between the first rotary shaft RS1 and the fourth rotary shaft RS4, and a third clutch CL3 mounted between the first rotary shaft RS1 and the third rotary shaft RS3.

The three brakes include a first brake B1 mounted between the sixth rotary shaft RS6 and the transmission case CS; a second brake B2 mounted between the third rotary shaft RS3 and the transmission case CS; and a third brake B3 mounted between the seventh rotary shaft RS7 and the transmission case CS.

That is, the third rotary element R1 of the first planetary gear device PG1 may be connected to the transmission case CS via the first brake B1 so as to be fixed or freely rotatable. The third rotary element R2 of the second planetary gear device PG2 may be connected to the transmission case CS via the second brake B2 so as to be fixed or freely rotatable. The first rotary element S3 of the third planetary gear device PG3 may be connected to the transmission case CS via the third brake B3 so as to be fixed or freely rotatable.

The first rotary element S2 of the second planetary gear device PG2 and the input shaft IN are intermittently connected to each other via the first clutch CL1. The third rotary element R2 of the second planetary gear device PG2 and the input shaft IN are intermittently connected to each other via the third clutch CL3. The second rotary element C4 of the fourth planetary gear device PG4 and the input shaft IN are intermittently connected to each other via the second clutch CL2.

The first brake B1, the second brake B2, the third brake B3, the first clutch CL1, the second clutch CL2, and the third clutch CL3 may be controlled by a controller (not shown) so as to be operated according to the operation mode table shown in FIG. 2 depending on the travelling situation of a vehicle, whereby 9 forward stages and 1 reverse stage are realized.

Referring to the first brake B1, the second brake B2, the third brake B3, the first clutch CL1, the second clutch CL2, and the third clutch CL3 as "gear shift elements," the transmission according to the present disclosure is configured such that one of the gear shift elements is released and another of the gear shift elements is connected in order to achieve a series of gear shifts ranging from a first stage to a ninth stage, as shown in FIG. 2; that is, a so-called clutch-to-clutch transmission is possible.

The first, second, and third rotary elements of the first planetary gear device PG1 include a first sun gear S1, a first carrier C1, and a first ring gear R1. The first, second, and third rotary elements of the second planetary gear device PG2 include a second sun gear S2, a second carrier C2, and a second ring gear R2. The first, second, and third rotary elements of the third planetary gear device PG3 include a third sun gear S3, a third carrier C3, and a third ring gear R3. The first, second, and third rotary elements of the fourth planetary gear device PG4 include a fourth sun gear S4, a fourth carrier C4, and a fourth ring gear R4.

The multi-stage transmission including the four planetary gear devices and the six gear shift elements as described above may realize 9 forward stages and 1 reverse stage according to the operation mode table shown in FIG. 2. A large number of gear shift stages, i.e. 9 gear shift stages, may be realized through a relatively small number of parts, a straightforward structure, and a low weight, whereby the fuel economy of vehicles is improved by the provision of gear ratios that are further optimized in consideration of the traveling situation of a vehicle.

As is apparent from the above description, the present disclosure provides a multi-stage transmission for vehicles configured such that 9 forward stages and 1 reverse stage are realized through a relatively small number of parts and a straightforward structure, whereby the fuel economy of vehicles is improved through driving of an engine at an optimal operation point and the quietness of vehicles is improved through quieter driving of the engine.

Although the preferred embodiments of the present disclosure have been described above with reference to the accompanying drawings, those skilled in the art will appreciate that the present disclosure can be implemented in various other embodiments without changing the technical ideas or features thereof.

What is claimed is:

1. A multi-stage transmission for vehicles comprising:
   an input shaft for receiving power from an engine;
   an output shaft for outputting the power;
   a first planetary gear device, a second planetary gear device, a third planetary gear device, and a fourth planetary gear device, each of the planetary gear devices having three rotary elements;
   a first rotary shaft connected to the input shaft;

a second rotary shaft connected to a first rotary element of the first planetary gear device and to a first rotary element of the second planetary gear device;

a third rotary shaft connected to a third rotary element of the second planetary gear device;

a fourth rotary shaft connected to a second rotary element of the third planetary gear device and to a second rotary element of the fourth planetary gear device;

a fifth rotary shaft connected to a second rotary element of the first planetary gear device, to a second rotary element of the second planetary gear device, and to a first rotary element of the fourth planetary gear device;

a sixth rotary shaft connected to a third rotary element of the first planetary gear device and to a third rotary element of the third planetary gear device;

a seventh rotary shaft connected to a first rotary element of the third planetary gear device; and an eighth rotary shaft connected to a third rotary element of the fourth planetary gear device and to the output shaft.

2. The multi-stage transmission according to claim 1, further comprising:

three clutches that interconnect the rotary shafts in respective pairs; and three brakes that selectively connect certain of the rotary shafts to a transmission case.

3. The multi-stage transmission according to claim 2, wherein the three clutches comprise a first clutch mounted between the first rotary shaft and the second rotary shaft, a second clutch mounted between the first rotary shaft and the fourth rotary shaft, and a third clutch mounted between the first rotary shaft and the third rotary shaft, and the three brakes comprise a first brake mounted between the sixth rotary shaft and the transmission case, a second brake mounted between the third rotary shaft and the transmission case, and a third brake mounted between the seventh rotary shaft and the transmission case.

4. The multi-stage transmission according to claim 1, wherein the first, second, and third rotary elements of the first planetary gear device comprise a first sun gear, a first carrier, and a first ring gear, the first, second, and third rotary elements of the second planetary gear device comprise a second sun gear, a second carrier, and a second ring gear, the first, second, and third rotary elements of the third planetary gear device comprise a third sun gear, a third carrier, and a third ring gear, and the first, second, and third rotary elements of the fourth planetary gear device comprise a fourth sun gear, a fourth carrier, and a fourth ring gear.

* * * * *